United States Patent
Inoue et al.

(10) Patent No.: US 10,059,226 B2
(45) Date of Patent: Aug. 28, 2018

(54) VEHICLE SEAT

(71) Applicants: TS TECH CO., LTD., Asaka-shi, Saitama (JP); HONDA R&D AMERICAS, INC., Raymond, OH (US)

(72) Inventors: Takayuki Inoue, Reynoldsburg, OH (US); Souheil Hage-Hassan, Reynoldsburg, OH (US); Todd Morris, Raymond, OH (US); Yuji Nakamura, Raymond, OH (US); Masakazu Okada, Raymond, OH (US)

(73) Assignees: TS TECH CO., LTD., Asaka-shi (JP); HONDA R&D AMERICAS, INC., Raymond, OH (US)

( * ) Notice: Subject to any disclaimer, the term of this patent is extended or adjusted under 35 U.S.C. 154(b) by 0 days.

(21) Appl. No.: 15/333,063

(22) Filed: Oct. 24, 2016

(65) Prior Publication Data

US 2017/0113574 A1 Apr. 27, 2017

Related U.S. Application Data

(60) Provisional application No. 62/245,557, filed on Oct. 23, 2015.

(51) Int. Cl.
*B60N 2/68* (2006.01)
*B60N 2/00* (2006.01)

(52) U.S. Cl.
CPC .............. *B60N 2/002* (2013.01); *B60N 2/68* (2013.01)

(58) Field of Classification Search
CPC ................................ B60N 2/002; B60N 2/68
See application file for complete search history.

(56) References Cited

U.S. PATENT DOCUMENTS

| | | | | |
|---|---|---|---|---|
| 7,137,665 | B2 * | 11/2006 | Osawa ................... | B60N 2/071 177/136 |
| 8,028,786 | B2 * | 10/2011 | Takayasu ............... | B60N 2/002 177/136 |
| 2008/0036251 | A1 * | 2/2008 | Endo ...................... | B60N 2/002 297/217.2 |
| 2014/0042789 | A1 * | 2/2014 | Kitaguchi ................ | B60N 2/06 297/344.1 |
| 2015/0291072 | A1 * | 10/2015 | Ito ........................... | B60N 2/72 297/452.2 |

FOREIGN PATENT DOCUMENTS

JP 2014-221605 A 11/2014

* cited by examiner

*Primary Examiner* — Philip F Gabler
(74) *Attorney, Agent, or Firm* — Oliff PLC

(57) ABSTRACT

A vehicle seat includes a pair of side frames and a load sensor. The load sensor is provided at a lower portion of the side frame or below the side frame. The vehicle seat further includes a supporting member which is connected to the side frame and which supports a seated person. The supporting member includes a seat portion which receives a weight of a seated person. The seat portion is provided below the load sensor.

6 Claims, 8 Drawing Sheets

VEHICLE SEAT

TECHNICAL FIELD

The present invention relates to a vehicle seat.

BACKGROUND ART

Recently, in order to improve the performance of safety systems such as an airbag, the operations of some safety systems are controlled in accordance with the weight of an occupant seated on a vehicle seat. As a conventional device which measures the weight of a seated occupant, a device is proposed which includes a load sensor between a vehicle floor and a seating portion of a vehicle seat to measure the weight of an occupant based on the amount of deformation of the vehicle seat (refer to Patent Document 1, for example).

PRIOR ART DOCUMENT

Patent Document

Patent Document 1: JP 2014-221605 A

SUMMARY OF INVENTION

Problem to Be Solved By the Invention

However, in the case of a sports car type vehicle in which a seating portion of a vehicle seat is provided as low as possible, there is a problem that it is difficult to provide a load sensor between a vehicle floor and a seating portion of the vehicle seat and it is not possible to measure the weight of an occupant seated on the vehicle seat with respect to the device disclosed in Patent Document 1 described above.

The present invention is made in view of the problem described above. The object of the present invention is to provide a vehicle seat which can measure the weight of a seated occupant even when a seating portion of the vehicle seat is provided as low as possible.

Means for Solving the Problem

To solve the above problem, the invention according to claim 1 is a vehicle seat including:
a pair of side frames; and
a load sensor provided at a lower portion of the side frame or below the side frame, wherein
the vehicle seat further includes a supporting member which is connected to the side frame and which supports a seated person,
the supporting member includes a seat portion which receives a weight of a seated person, and
the seat portion is provided below the load sensor.

The invention according to claim 2 is the vehicle seat according to claim 1, wherein a protecting member which protects the load sensor is provided between the load sensor and the seat portion.

The invention according to claim 3 is the vehicle seat according to claim 2, wherein the protecting member is a linear member formed so as to surround the load sensor.

The invention according to claim 4 is the vehicle seat according to claim 1, wherein the seat portion is formed so as to be accommodated between the pair of side frames.

The invention according to claim 5 is the vehicle seat according to claim 2, wherein the protecting member is formed such that a rear end of the protecting member is positioned in rear of a rear end of the load sensor and such that a front end of the protecting member is positioned in front of a front end of the load sensor.

The invention according to claim 6 is the vehicle seat according to claim 3, wherein at least a portion of the protecting member which extends along a longitudinal direction of the load sensor has a linear shape.

The invention according to claim 7 is the vehicle seat according to claim 1, wherein
the load sensors are provided at a front side and a rear side of the side frame, and
the seat portion is provided below the load sensor provided at the rear side of the side frame.

Effects of the Invention

In the invention according to claim 1, since the seat portion is provided below the load sensor, the weight of a seated occupant can be measured even when the seat portion of the vehicle seat is provided as low as possible and the center of gravity can be lowered in a vehicle seat including a load sensor.

In the invention according to claim 2, since the protecting member which protects the load sensor is provided between the load sensor and the seat portion, even when a pad member of the vehicle seat sags when an occupant sits on the vehicle seat, the pad member can be prevented from pressing the load sensor.

Therefore, the load sensor can be prevented from being damaged due to the pressure to the load sensor applied by the pad member of the vehicle seat.

In the invention according to claim 3, since the protecting member is a linear member and is formed so as to surround the load sensor, forming the protecting member is easy.

In the invention according to claim 4, since the seat portion is formed so as to be accommodated between the pair of side frames, the center of gravity of the vehicle seat can be preferably lowered without increasing the width of the vehicle seat.

In the invention according to claim 5, since the protecting member is formed such that the rear end of the protecting member is positioned in rear of the rear end of the load sensor and such that the front end of the protecting member is positioned in front of the front end of the load sensor, the surrounding of the load sensor can be protected and the damage to the load sensor can be preferably prevented.

In the invention according to claim 6, since at least the portion of the protecting member which extends along the longitudinal direction of the load sensor has a linear shape, forming the protecting member is easy.

In the invention according to claim 7, since the load sensors are provided at the front side and the rear side of the side frame, and the seat portion is provided below the load sensor provided at the rear side of the side frame, the weight of a seated occupant can be measured even when the seat portion of the vehicle seat is provided as low as possible and the center of gravity of the vehicle seat including a load sensor can be lowered.

DESCRIPTION OF PREFERRED EMBODIMENT

Hereinafter, an embodiment of the present invention will be described with reference to the drawings. Though various technical limitations which are preferable to carry out the present invention are added to the embodiment described below, the scope of the invention is not limited to the following embodiment and the illustrated examples.

Figure 1:
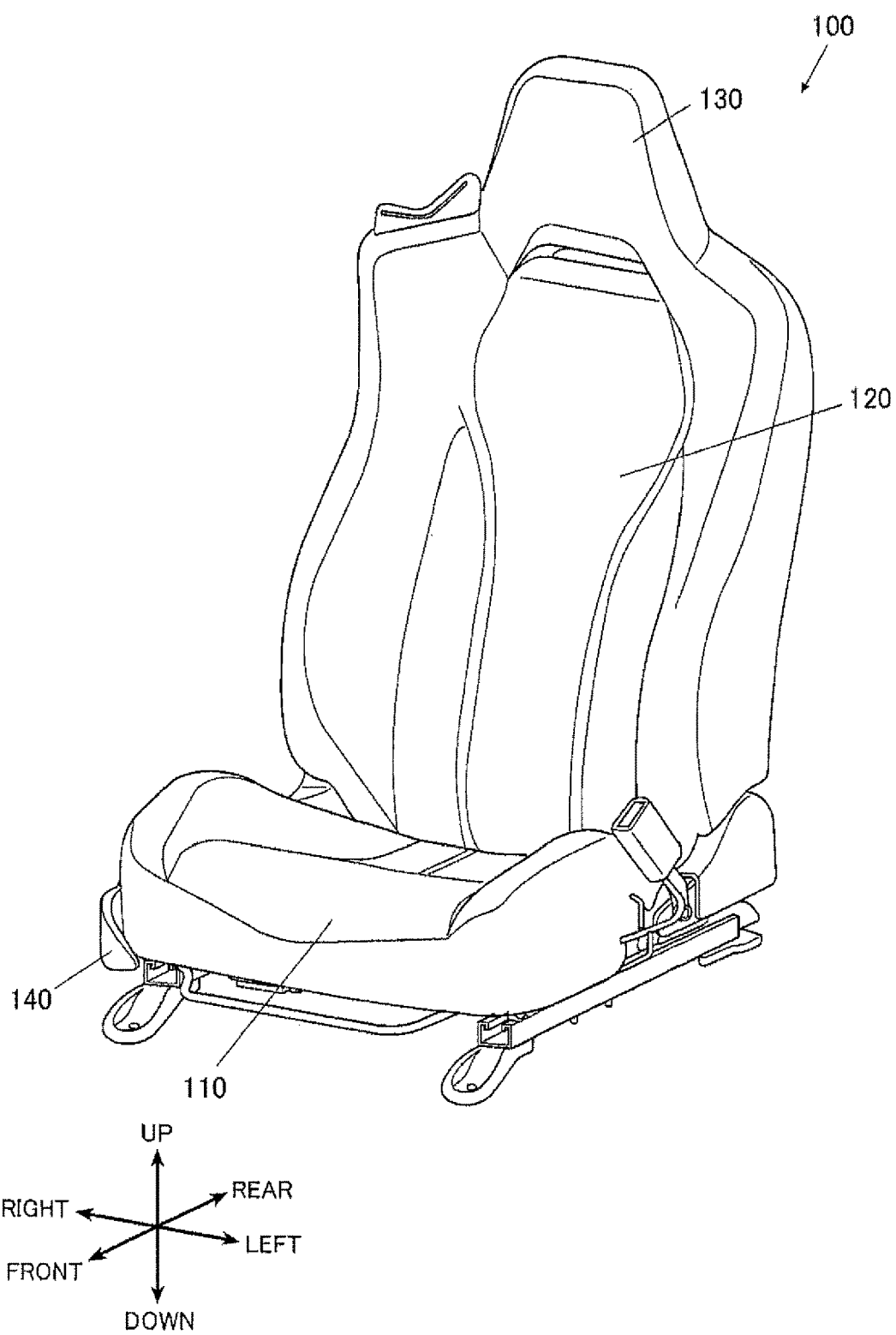
FIG. 1 is a perspective view of a vehicle seat of the present embodiment.

FIG. 1 is a perspective view of a vehicle seat according to the present embodiment. The up, down, left, right, front and rear arrows respectively indicate the directions seen from a seated person (occupant) seated on the vehicle seat.

As shown in FIG. 1, the vehicle seat 100 includes a seat cushion 110 on which a seated person is to be seated, a seatback 120 attached to the rear end of the seat cushion 110 pivotally in front and rear directions and which supports the seated person's back, and a headrest 130 which supports the seated person's head. The vehicle seat 100 also includes a side cover member 140 which protects the right side of the seat cushion 110.

Figure 2:
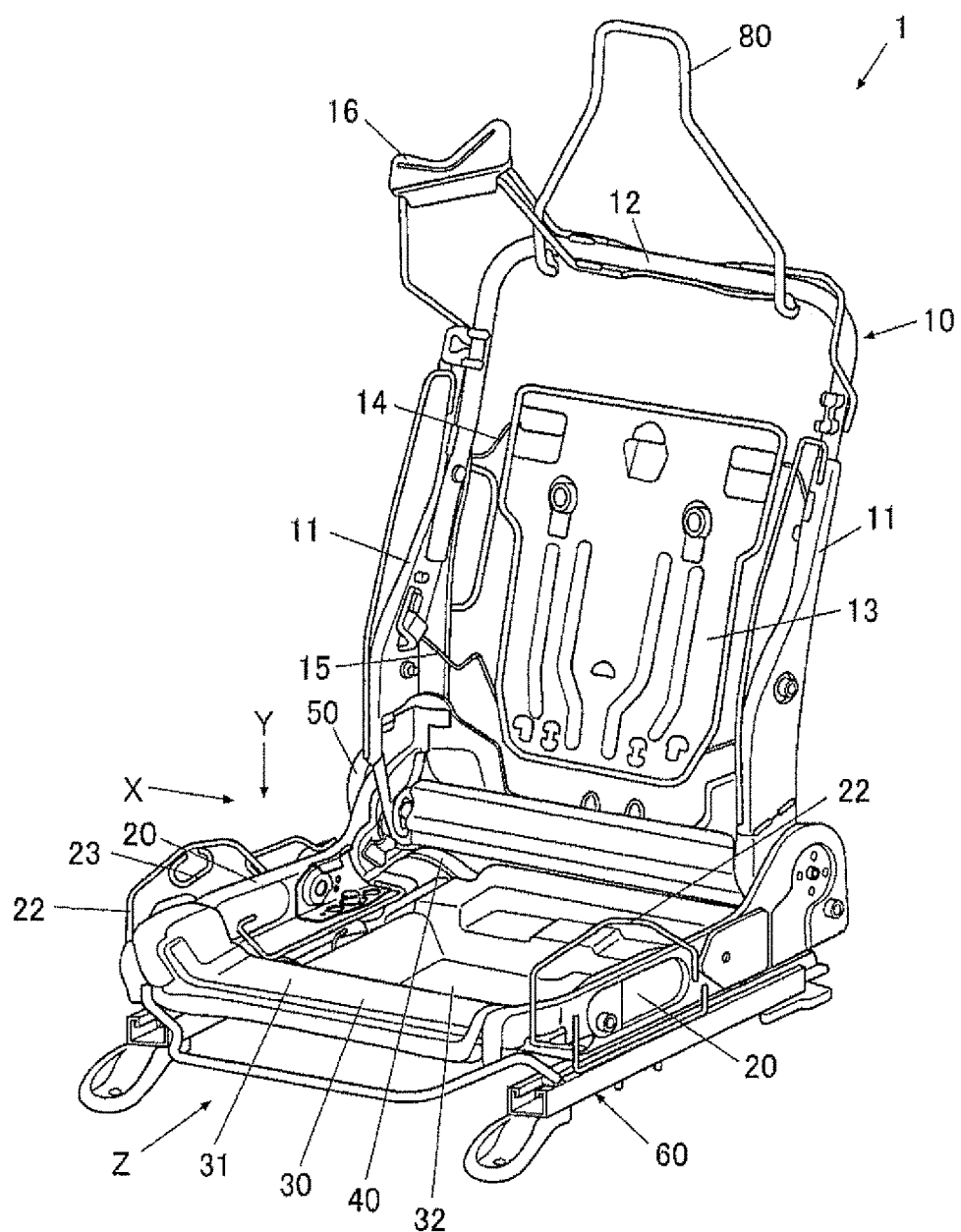
FIG. 2 is a perspective view of a seat frame of the present embodiment.
Figure 3:
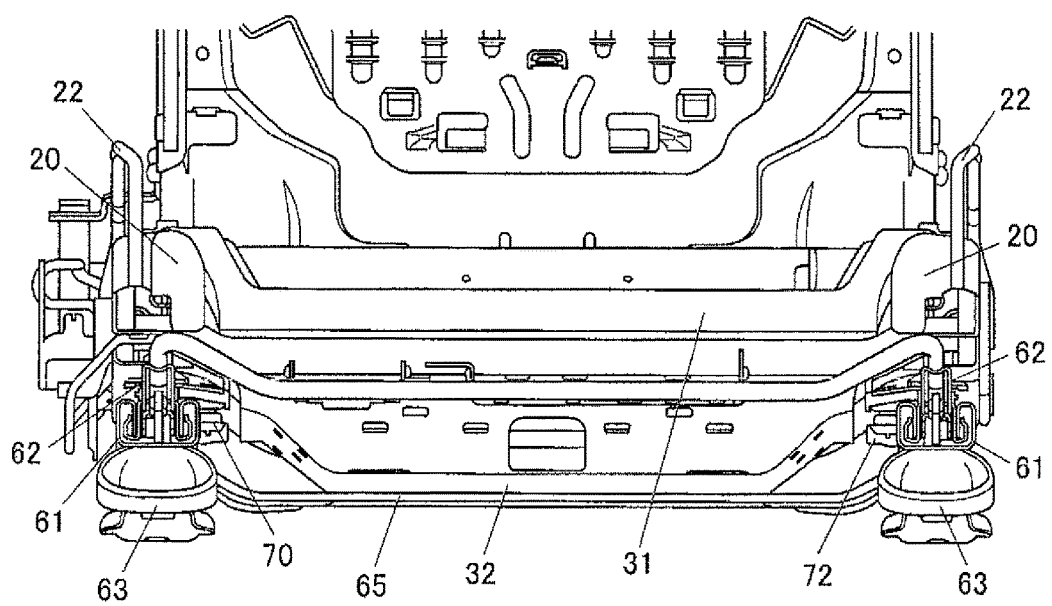
FIG. 3 is a view on arrow Z of FIG. 2.
Figure 3:
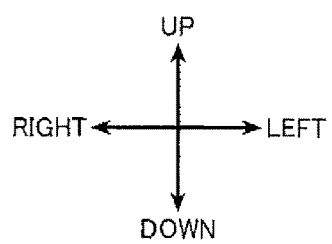
Figure 4:
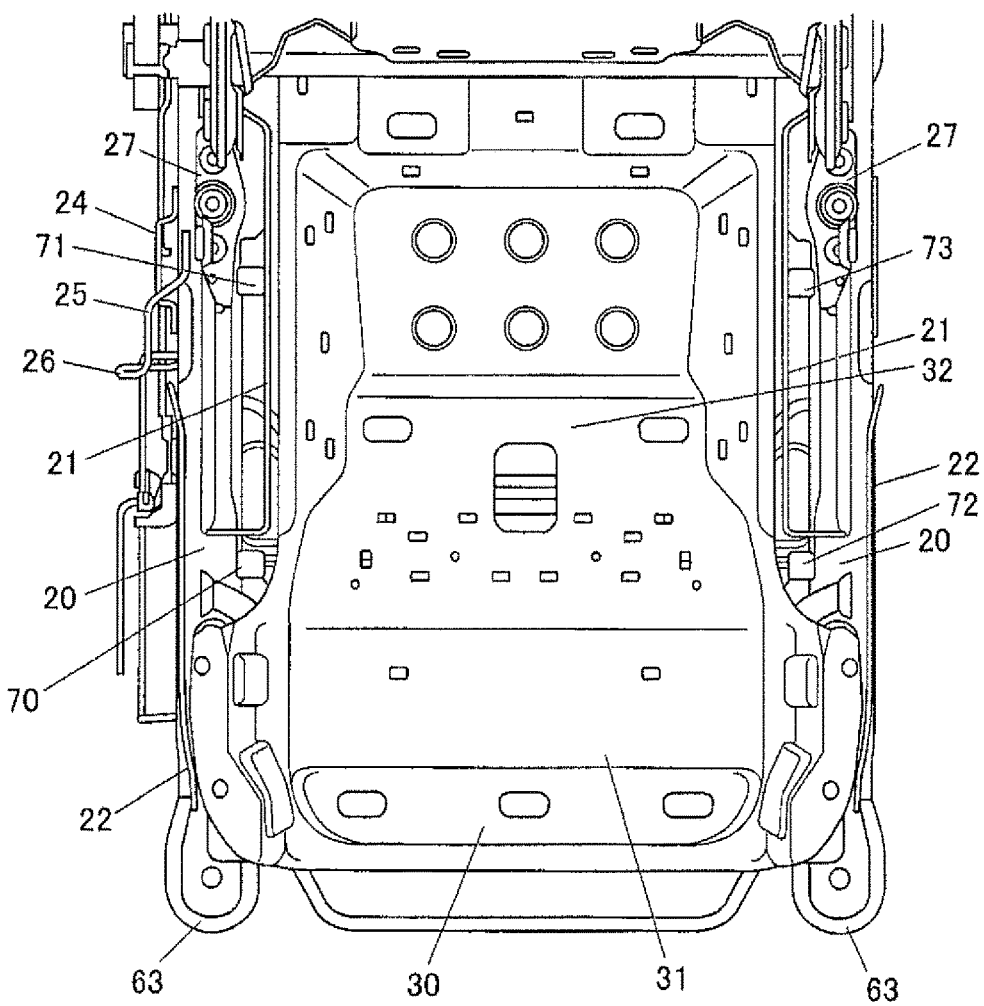
FIG. 4 is a view on arrow Y of FIG. 2.
Figure 5:
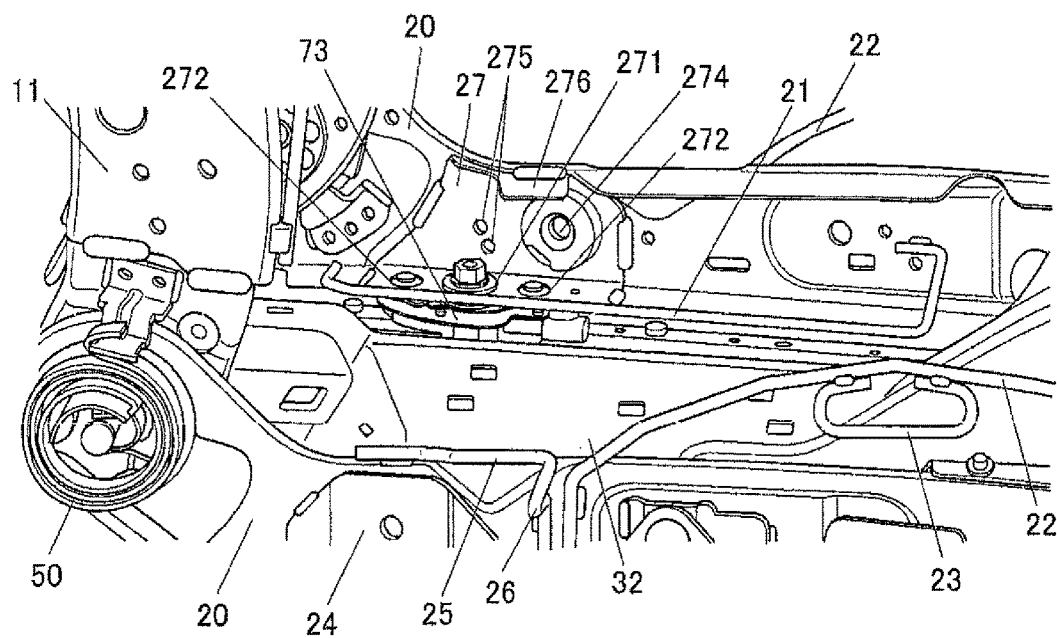
FIG. 5 is a view on arrow X of FIG. 2.
Figure 5:
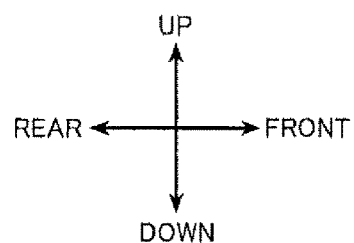
Figure 6:
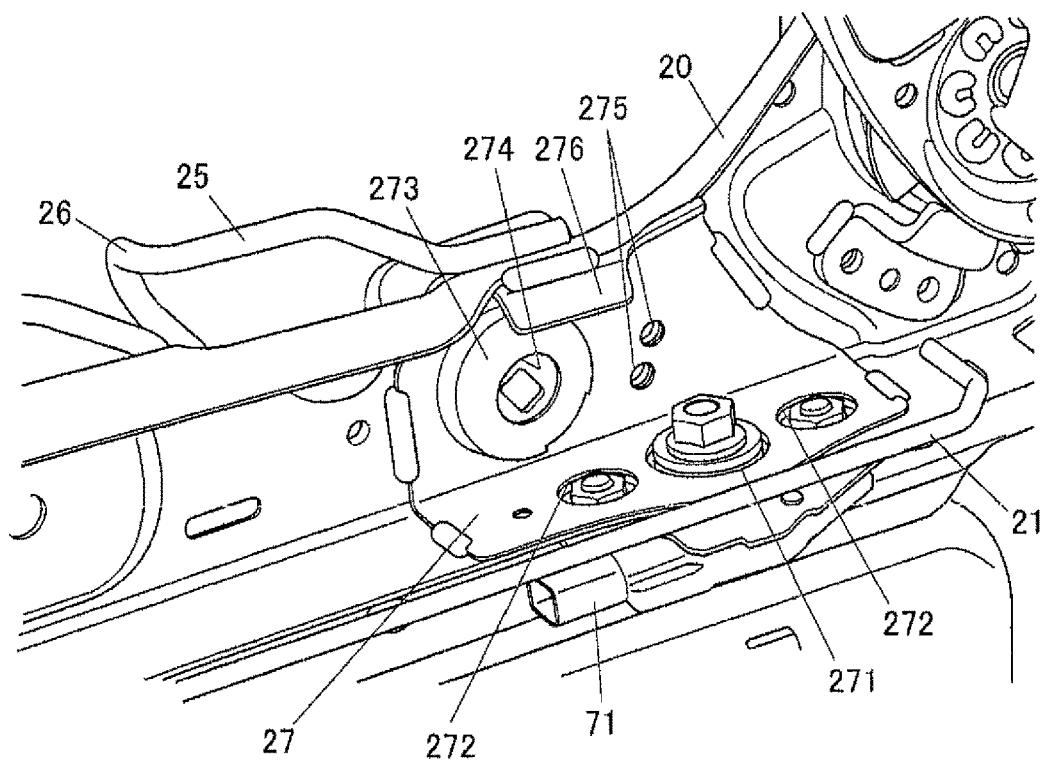
FIG. 6 is a partial enlarged view of a reinforcement member provided on a right side frame.
Figure 7:
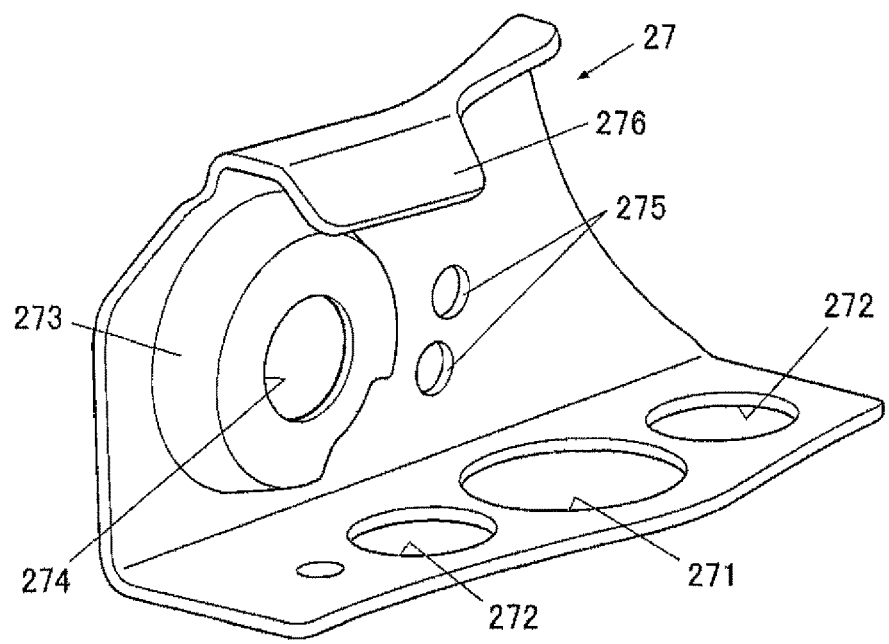
FIG. 7 is a perspective view of the reinforcement member itself to be provided on the right side frame.
Figure 8:
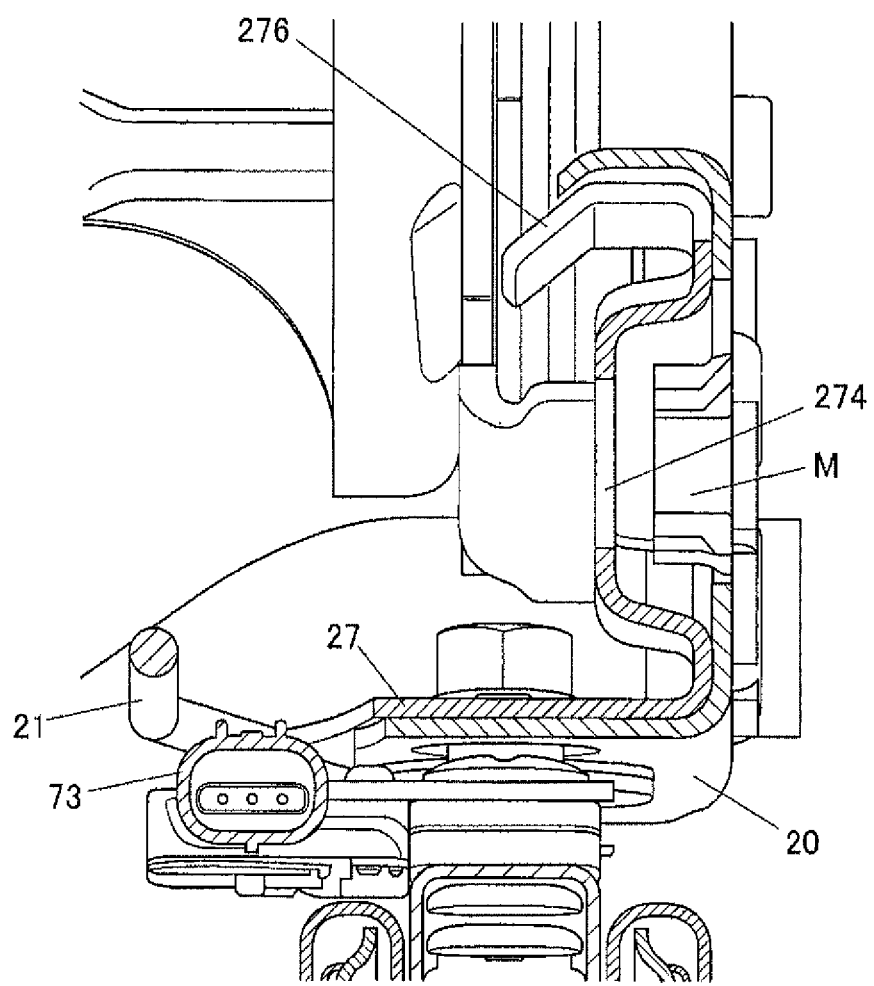
FIG. 8 is a cross-sectional view of the reinforcement member provided on a left side frame.
Figure 9:
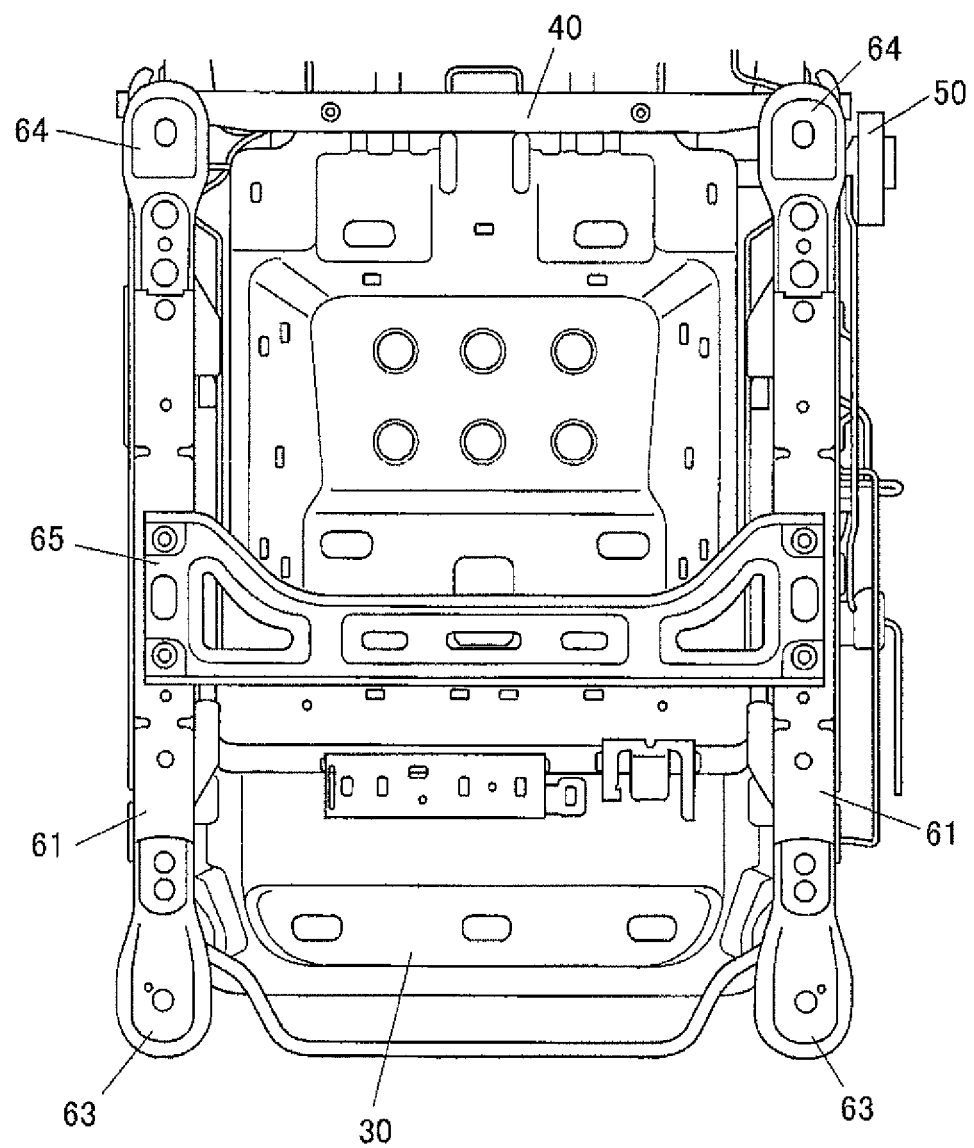
FIG. 9 is a bottom view of the seat frame shown in FIG. 2.
Figure 9:
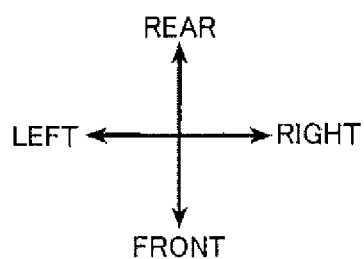

FIG. 2 is a perspective view of a seat frame 1 in a state where pad members and the side cover member 140 are removed from the vehicle seat 100 shown in FIG. 1. FIG. 3 is a view on arrow Z of FIG. 2. FIG. 4 is a view on arrow Y of FIG. 2. FIG. 5 is a view on arrow X of FIG. 2. FIG. 6 is a partial enlarged view of a reinforcement member provided on a right side frame 20. FIG. 7 is a perspective view of the reinforcement member 27 itself to be provided on the right side frame 20. FIG. 8 is a cross-sectional view of the reinforcement member 27 provided on a left side frame 20. FIG. 9 is a bottom view of the seat frame 1 shown in FIG. 2.

As shown in FIG. 2, the seat frame 1 includes a seatback frame 10, right and left side frames 20, 20 respectively provided on the right and left sides of the lower portion of the seatback frame 10, a cushion frame 30 provided so as to extend between the right and left side frames 20, 20, a supporting frame 40 which is connected to the right and left side frames 20, 20 and which supports the rear end of the cushion frame 30, a reclining mechanism 50 which tilts the seatback frame 10 with respect to the side frames 20, 20, a slide mechanism 60 which moves the side frames 20, 20 in front and rear directions, a first to forth load sensors 70, 71, 72, 73 (refer to FIG. 4) and a core member 80 provided at the upper portion of the seatback frame 10 to form the headrest 130.

As shown in FIG. 2, the seatback frame 10 includes right and left back side frames 11, 11, and an upper frame 12 connecting the back side frames 11, 11 at the upper part thereof.

The seatback frame 10 includes a pressure receiving member 13 which supports the pad member from behind inside the seatback frame 10. The pressure receiving member 13 is a resin plate member formed so as to have a substantially rectangular shape. The pressure receiving member 13 is supported inside the frame by engaging with two wires 14, 15 which extend between the back side frames 11, 11.

The seatback frame 10 also includes a shoulder anchor 16 at the upper right part thereof for inserting a seatbelt (not shown).

The seatback frame 10 and the side frames 20, 20 are pivotally connected with each other via the reclining mechanism 50.

As shown in FIG. 2, the right and left side frames 20, 20 are provided apart from each other along right and left directions corresponding to a seat width and are formed so as to extend along front and rear directions. A movable upper rail 62 (refer to FIG. 3) described below is attached to the lower side of each of the side frames 20, 20.

As shown in FIG. 4, the side frames 20, 20 respectively include a protecting member 21 for protecting the second load sensor 71 and a protecting member 21 for protecting the forth load sensor 73 described below.

Each of the protecting members 21, 21 is a wire (linear member). Each of the protecting members 21, 21 is bent like hooks at both ends thereof and the remaining part is formed so as to have a linear shape. Each of the protecting members 21, 21 is welded to an opposing side part of the corresponding side frames 20, 20. Specifically, the protecting member 21 welded to the right side frame 20 is welded such that one end thereof is positioned in front of the second load sensor 71 and the other end is positioned in rear of the second load sensor 71. In other words, the protecting member 21 welded to the right side frame 20 is provided so as to surround the second load sensor 71. Therefore, the pad member can be prevented from pressing the second load sensor 71.

The protecting member 21 welded to the left side frame 20 is welded such that one end thereof is positioned in front of the forth load sensor 73 and the other end is positioned in rear of the forth load sensor 73. In other words, the protecting member 21 welded to the left side frame 20 is provided so as to surround the forth load sensor 73. Therefore, the pad member can be prevented from pressing the forth load sensor 73.

As shown in FIG. 2, each of the side frames 20, 20 includes a shape maintaining member 22 to maintain the shape of the pad members which constitute the seat cushion 110.

Each of the shape maintaining member 22, 22 is a wire (linear member) and formed so as to be arch-like. Each of the shape maintaining members 22, 22 are welded at both ends thereof on the exterior surface of corresponding side frames 20, 20. That is, each of the shape maintaining members 22, 22 is welded on the surface opposite from the surfaces opposing each other of the side frames 20, 20. Specifically, the shape maintaining member 22 welded to the right side frame 20 is welded to the front end of the right side frame 20 at one end and is welded to the middle of the right side frame 20 at the other end. The shape maintaining member 22 welded to the right side frame 20 is provided with an engaging member 23 which engages with the side cover member 140 described above. The engaging member 23 is a wire (linear member) and formed so as to have a C shape. The engaging member 23 is welded at both ends thereof to lower middle portion of the shape maintaining member 22 which is welded to the right side frame 20.

The shape maintaining member 22 welded to the left side frame 20 is welded to the front end of the left side frame 20 at one end and is welded to the middle of the left side frame 20 at the other end.

As shown in FIG. 5, the right side frame 20 includes a seatbelt fixing portion 24 to fix the base end of the seatbelt (waist belt) on the exterior surface thereof (i.e., the surface opposite from the surface opposing the left side frame 20). The seatbelt fixing portion 24 is welded on the exterior surface of the right side frame 20 between the middle portion and the rear end.

The seatbelt fixing portion 24 is provided at the position next to a reinforcing member 27 described below so as to sandwich the right side frame between the seatbelt fixing portion 24 and the reinforcing member 27. The reinforcing member 27 is provided just above a mounting portion to which the second load sensor 71 is attached. The protecting member 21 which is welded to the right side frame 20 is welded such that one end thereof is positioned in front of the seatbelt fixing portion 24 and the other end is positioned in rear of the seatbelt fixing portion 24 (refer to FIG. 4).

As shown in FIG. 5, the right side frame 20 is provided on the exterior surface thereof with a side cover protecting member 25 in front of the seatbelt fixing portion 24 for protecting the side cover member 140. The side cover protecting member 25 is a wire (linear member) and includes a stopper portion 26 formed by bending one end of the side cover protecting member 25 like a hook and then bending the end into U shape. One end of the side cover protecting member 25 which includes the stopper portion 26 is welded in front of the seatbelt fixing portion 24 and the other end is welded above the seatbelt fixing portion 24. Thereby, when the seatbelt fixed to the seatbelt fixing portion 24 moves forward (for example, when the brakes are applied in a vehicle and the body of a seated person moves forward), the seatbelt can be prevented from moving forward from the stopper portion 26. Therefore, since too large movement of the seatbelt fixed to the seatbelt fixing portion 24 is suppressed, when the seatbelt abuts the side cover member 140, the load applied to the side cover member 140 can be reduced. Thus, the damage of the side cover member 140 caused by the seatbelt abutting the side cover member 140 can be prevented.

As shown in FIGS. 5 and 6, the side frames 20, 20 respectively include the reinforcing members 27 around corresponding mounting portions of the second load sensor 71 and the forth load sensor 73 described below.

Each of the reinforcing members 27, 27 is a plate-like member and has substantially L shaped cross section. The reinforcing members 27, 27 are respectively welded onto corresponding side frames 20, 20 so as to follow the surfaces on opposing side of the side frames 20, 20. Thereby, since the rigidity around the mounting portions of the second load sensor 71 and the fourth load sensor 73 on the side frames 20, 20 can be improved, the deformation of the side frames 20, 20 can be suppressed, and thus, the deformation of the second load sensor 71 and the fourth load sensor 73 can be suppressed. Since the reinforcing members 27, 27 are plate members and formed so as to have substantially L shaped cross sections, the rigidity around the mounting portions can be further improved. Also, since the reinforcing members 27, 27 are respectively provided on opposing sides of the side frames 20, 20, the width of the seat frame 1 can be suppressed.

As shown in FIGS. 5 and 6, each of the reinforcing members 27, 27 has a plurality of openings 271, 272 on the bottom thereof through which bolts and nuts can be inserted when the second load sensor 71 and the fourth load sensor 73 are attached to corresponding side frames 20, 20. Thereby, workability can be improved when the reinforcing member 27 is installed. As shown in FIG. 7, the diameter of the opening 271 is larger than the diameter of the openings 272 which are formed on both sides of the opening 271. The diameters of the openings are different to prevent erroneous installation of the reinforcing member 27.

As shown in FIGS. 5 and 6, the reinforcing members 27, 27 respectively include beads 273, 273 formed on the side surface thereof to improve rigidity. The beads 273, 273 have recessed shapes toward inside of the reinforcing members 27, 27 (i.e., opposing directions of the reinforcing members 27, 27), and are formed integrally with the respective reinforcing members 27, 27. The number of parts can be reduced by forming respective beads 273, 273 integrally with the reinforcing members 27, 27. Specifically, each of the beads 273, 273 has a circular cup shaped. Each of the beads 273, 273 has a circular cup shaped to ensure the range of motion of another member M (for example, a buckle) which is installed on the outer side of the side frame 20 as shown in FIG. 8. A circular opening 274 is formed on the bottom of each of the cup shaped beads 273, 273. This opening 274 is also formed to ensure the range of motion of another member M (for example, a buckle).

Position regulating portions 275, 275 are respectively formed on the side surface of the reinforcing members 27, 27 for positioning another member M (for example, buckle) when another member M is installed. The position regulating portions 275, 275 are through-holes opened in the side surface of the reinforcing member 27.

The reinforcing members 27, 27 respectively have positioning protrusions 276 on the upper portion of the side surface for positioning the reinforcing members 27, 27 when the reinforcing members 27, 27 are respectively welded to corresponding side frames 20, 20.

As shown in FIG. 4, the cushion frame (supporting member) 30 includes a bridging portion 31 to install the cushion frame 30 on the upper surface of the side frames 20, 20 and a seat portion 32 which receives the weight of a seated person.

The bridging portion 31 is provided at the front of the cushion frame 30. The bridging portion 31 is formed so as to have a substantially the same width as the width between the side frames 20, 20.

The seat portion 32 is provided at the rear of the cushion frame. The seat portion 32 is formed so as to have a width along right and left directions smaller than the width between the side frames 20, 20. That is, the seat portion 32 is formed so as to have a width along right and left directions which is accommodated between the side frames 20, 20. As shown in FIGS. 2 and 3, the seat portion 32 has a recessed shape, and is formed such that the bottom position of the recessed shape is lower than the positions where the first to forth load sensors 71, 72, 73, 74 are respectively provided.

As shown in FIGS. 3 and 9, the slide mechanism 60 includes right and left fixed lower rails 61, 61 which are fixed on a vehicle floor and right and left movable upper rails 62, 62 which are slidably engaged with the corresponding fixed lower rails 61, 61 along front and rear directions.

The slide mechanism 60 includes front legs 63, 63 at the front ends of the respective fixed lower rails 61, 61 and rear legs 64, 64 at the rear ends of the respective fixed lower rails 61, 61.

The slide mechanism 60 also includes a lower bracket 65 which is provided between the lower surfaces of the fixed lower rail 61, 61. The lower bracket 65 bridges the fixed lower rails 61, 61 to increase the rigidity and to suppress the changes of the distance between the right and left lower rails 61, 61.

As shown in FIGS. 3 and 4, the first load sensor 70 is attached to the front portion of the lower surface of the right side frame 20. As shown in FIG. 6, the second load sensor 71 is attached to the rear portion of the lower surface of the right side frame 20. The first load sensor 70 and the second load sensor 71 are sensors each utilizing strain gauges. The first load sensor 70 and the second load sensor 71 detect load as an electric signal based on the strain caused by the tension and compression of the side frame 20.

As shown in FIGS. 3 and 4, the third load sensor 72 is attached to the front portion of the lower surface of the left side frame 20. As shown in FIGS. 5 and 8, the fourth load sensor 73 is attached to the rear portion of the lower surface of the left side frame 20. The third load sensor 72 and the fourth load sensor 73 are sensors which utilize strain gauges, and detect load as an electric signal based on the strain caused by the tension and compression of the side frame 20 similarly to the first load sensor 70 and the second load sensor 71.

Since the detection of load can be realized by using known techniques, the detailed explanation thereof will be omitted.

In the vehicle seat 100 (seat frame 1) configured as above, when a seated person (occupant) sits on a seat cushion 110, the weight of the seated person (bodyweight) acts on the load sensors 70, 71, 72, 73 provided on the side frames 20, 20 through the bridging portion 31 and supporting frame 40, and the weight of the seated person is detected as an electric signal by the load sensors 70, 71, 72, 73.

As described above, in accordance with the present invention, since the seat portion 32 is provided lower than the first to fourth load sensors 70, 71, 72, 73, the weight of a seated person (occupant) can be measured even when the seat portion 32 of the vehicle seat 100 is provided as low as possible and the center of gravity can be lowered in a vehicle seat including a load sensor.

In accordance with the present embodiment, since the protecting members 21 which protect load sensors are respectively provided between the second load sensor 71 and the seat portion 32 and between the fourth load sensor 73 and the seat portion 32, even when the pad member of the vehicle seat 100 sags when an occupant sits on the vehicle seat 100, the pad member can be prevented from pressing the second load sensor 71 and the fourth load sensor 73.

Therefore, the second load sensor 71 and the fourth load sensor 73 can be prevented from being damaged due to the pressure applied by the pad member of the vehicle seat 100.

In accordance with the present embodiment, since the protecting members 21, 21 are linear members (wires) and are respectively formed so as to surround the second load sensor 71 and the fourth load sensor 73, forming the protecting member 21 is easy.

In accordance with the present embodiment, since the seat portion 32 is formed so as to be accommodated between the pair of side frames 20, 20, the center of gravity of the vehicle seat 100 can be preferably lowered without increasing the width of the vehicle seat 100.

In accordance with the present invention, since the protecting members 21, 21 are formed such that the rear ends of the protecting member 21, 21 are respectively positioned in rear of the rear ends of the second load sensor 71 and the fourth load sensor 73 and such that the front ends of the protecting members 21, 21 are respectively positioned in front of the front ends of the second load sensor 71 and the fourth load sensor 73, the surroundings of the second load sensor 71 and the fourth load sensor 73 can be protected and the damage to the second load sensor 71 and the fourth load sensor 73 can be preferably prevented.

In accordance with the present embodiment, since at least the portions of the protecting members 21, 21 which respectively extend along the longitudinal direction of the second load sensor 71 and the fourth load sensor 73 have linear shapes, forming the protecting members 21, 21 is easy.

Embodiments to which the present invention can be applied is not limited to the embodiment described above, but may be modified in appropriate without departing from the spirit of the present invention.

For example, in the embodiment described above, four load sensors from the first to fourth load sensors 70, 71, 72, 73 are provided. However, any configuration which can detect the weight of a seated person may be applicable. For example, only two load sensors such as the first load sensor 70 and the fourth load sensor 73 or the second load sensor 71 and the third load sensor 72 may be provided in cross-coupled manner.

DESCRIPTION OF REFERENCE NUMERALS 100 vehicle seat
1 seat frame
10 seatback frame
20 side frame
21 protecting member
22 shape maintaining member
23 engaging member
24 seatbelt fixing portion
25 side cover protecting member
26 stopper portion
27 reinforcing member
30 cushion frame
31 bridging portion
32 seat portion
40 supporting frame
50 reclining mechanism
60 slide mechanism
70 first load sensor
71 second load sensor
72 third load sensor
73 fourth load sensor
80 core member

The invention claimed is:

1. A vehicle seat comprising:
a pair of side frames; and
a load sensor provided at a lower portion of one of the side frames or below the one side frame, wherein:
the vehicle seat further comprises a supporting member that is connected to the side frames and that is configured to support a seated person,
the supporting member includes (i) a bridging portion by which the supporting member is installed on upper surfaces of the side frames and (ii) a seat portion configured to receive a weight of the seated person, and
the seat portion has a recessed shape between the side frames such that a bottom of the seat portion is lower than the load sensor.

2. The vehicle seat according to claim 1, wherein a protecting member which protects the load sensor is provided between the load sensor and the seat portion.

3. The vehicle seat according to claim 2, wherein the protecting member is bent so as to surround the load sensor.

4. The vehicle seat according to claim 3, wherein at least a portion of the protecting member which extends along a longitudinal direction of the load sensor has a straight shape.

5. The vehicle seat according to claim 2, wherein the protecting member is formed such that a rear end of the protecting member is positioned behind a rear end of the load sensor and such that a front end of the protecting member is positioned in front of a front end of the load sensor.

6. The vehicle seat according to claim 1, wherein:
the load is a first load sensor, which is provided at a front side of the one side frame,
a second load sensor is provided at a rear side of the one side frame, and
the bottom of the seat portion is lower than the second load sensor.

\* \* \* \* \*